US010794734B2

(12) United States Patent
Thomsen

(10) Patent No.: US 10,794,734 B2
(45) Date of Patent: Oct. 6, 2020

(54) DEBUBBLING SLEEVE FOR FLUID SENSORS AND SENSOR SYSTEMS COMPRISING SAME

(71) Applicant: TE Connectivity Norge AS, Blomsterdalen (NO)

(72) Inventor: Frank Thomsen, Sandsli (NO)

(73) Assignee: TE CONNECTIVITY NORAG AS, Blomsterdalen (NO)

(*) Notice: Subject to any disclaimer, the term of this patent is extended or adjusted under 35 U.S.C. 154(b) by 240 days.

(21) Appl. No.: 15/351,539

(22) Filed: Nov. 15, 2016

(65) Prior Publication Data

US 2017/0138826 A1 May 18, 2017

(30) Foreign Application Priority Data

Nov. 16, 2015 (EP) .................................. 15194826

(51) Int. Cl.
*G01D 11/24* (2006.01)
*F01N 3/20* (2006.01)
*G01N 1/40* (2006.01)

(52) U.S. Cl.
CPC .......... *G01D 11/245* (2013.01); *F01N 3/2066* (2013.01); *F01N 2610/02* (2013.01); *F01N 2610/1406* (2013.01); *F01N 2610/148* (2013.01); *F01N 2900/1814* (2013.01); *F01N 2900/1818* (2013.01); *G01N 2001/4066* (2013.01); *Y02T 10/24* (2013.01)

(58) Field of Classification Search
CPC ... G01N 1/10; G01D 11/245; F01N 2610/148
USPC ........................................................ 73/64.56
See application file for complete search history.

(56) References Cited

U.S. PATENT DOCUMENTS

| 4,440,717 A | * | 4/1984 | Bevilacqua | G01F 23/22 376/247 |
| 4,620,084 A | * | 10/1986 | Cunningham et al. | G05D 23/24 219/203 |
| 4,796,658 A | * | 1/1989 | Caple | E02D 31/02 137/312 |
| 5,505,849 A | * | 4/1996 | Rama, Jr. | B01D 29/27 210/232 |
| 5,591,344 A | * | 1/1997 | Kenley | A61L 2/04 210/636 |
| 5,707,504 A | * | 1/1998 | Jyouno | G01N 27/4077 204/424 |
| 8,137,625 B2 | * | 3/2012 | Sasanuma | G01N 27/18 422/68.1 |

(Continued)

FOREIGN PATENT DOCUMENTS

| CN | 202133636 U | 2/2012 |
| EP | 1669742 A1 | 6/2006 |

(Continued)

OTHER PUBLICATIONS

English Translation of KR101205234, Nov. 2012.*

(Continued)

*Primary Examiner* — Alexander A Mercado

(57) ABSTRACT

A debubbling sleeve for a fluid sensor of a sensor system is disclosed. The debubbling sleeve has a receptacle closed circumferentially around a sleeve bottom and a first passageway extending through the sleeve bottom. The receptacle contains the fluid sensor.

17 Claims, 3 Drawing Sheets

(56) References Cited

U.S. PATENT DOCUMENTS

| | | | | |
|---|---|---|---|---|
| 8,372,278 | B1* | 2/2013 | Nguyen | B01D 35/0273 123/196 A |
| 8,521,451 | B2* | 8/2013 | Kong | G01N 11/10 702/130 |
| D716,673 | S* | 11/2014 | Frivik | D10/53 |
| 8,967,181 | B2* | 3/2015 | Wetzel | B60K 15/03519 137/202 |
| 9,377,441 | B2* | 6/2016 | Reimer | G01N 29/02 |
| 10,145,341 | B2* | 12/2018 | Kim | F02M 37/14 |
| 10,371,030 | B2* | 8/2019 | Kruse | B01D 53/9431 |
| 2006/0108222 | A1* | 5/2006 | Yamada | G01N 27/4077 204/431 |
| 2007/0006639 | A1* | 1/2007 | Sasanuma | G01N 25/18 73/53.01 |
| 2007/0251823 | A1* | 11/2007 | Yamada | G01N 27/4077 204/424 |
| 2008/0038153 | A1* | 2/2008 | Yamamoto | G01F 23/268 422/82.12 |
| 2008/0205478 | A1* | 8/2008 | Sasanuma | G01N 27/18 374/44 |
| 2008/0247912 | A1* | 10/2008 | Izutani | F01N 11/00 422/82.12 |
| 2008/0290184 | A1* | 11/2008 | Stritzinger | F01N 3/2066 237/12.3 C |
| 2009/0090178 | A1* | 4/2009 | Sasanuma | G01F 23/266 73/295 |
| 2009/0211906 | A1* | 8/2009 | Sugaya | G01N 27/4075 204/424 |
| 2010/0050603 | A1* | 3/2010 | Seino | F01N 3/2066 60/282 |
| 2010/0154907 | A1* | 6/2010 | Lecea | F01N 3/2066 137/565.29 |
| 2010/0212400 | A1* | 8/2010 | Nakamura | G01N 27/18 73/25.03 |
| 2011/0271754 | A1* | 11/2011 | Ross, Jr. | G01F 23/74 73/295 |
| 2012/0174650 | A1* | 7/2012 | Ariessohn | B08B 3/12 73/23.2 |
| 2012/0181261 | A1* | 7/2012 | Bruck | F01N 3/2066 219/205 |
| 2012/0186334 | A1* | 7/2012 | Steinhauser | G01N 27/123 73/61.76 |
| 2013/0061665 | A1* | 3/2013 | Itou | F01N 3/103 73/114.75 |
| 2013/0318950 | A1* | 12/2013 | Gottwald | F01N 3/2066 60/295 |
| 2015/0023843 | A1* | 1/2015 | Driscoll | F01N 3/208 422/168 |
| 2015/0089996 | A1* | 4/2015 | Reimer | G01N 29/02 73/19.03 |
| 2015/0196862 | A1* | 7/2015 | Cassidy | B01D 35/0276 55/372 |
| 2015/0198071 | A1* | 7/2015 | Hudgens | B01D 29/56 210/805 |
| 2015/0218990 | A1* | 8/2015 | Hudgens | F01N 3/2066 423/239.1 |
| 2015/0247439 | A1* | 9/2015 | Hirayama | F01N 3/2066 392/441 |
| 2015/0260687 | A1* | 9/2015 | Kinoshita | G01N 27/18 73/61.79 |
| 2015/0337708 | A1* | 11/2015 | Schlenke | F01N 3/2066 73/61.59 |
| 2016/0070016 | A1* | 3/2016 | Wang | E21B 47/0007 73/152.28 |
| 2016/0215910 | A1* | 7/2016 | Hrncir | G01D 11/30 |
| 2016/0339370 | A1* | 11/2016 | Hudgens | B01D 35/027 |
| 2017/0122170 | A1* | 5/2017 | Fahrenkrug | B01D 29/114 |
| 2017/0189837 | A1* | 7/2017 | Herold | B01D 35/0276 |
| 2017/0370818 | A1* | 12/2017 | Gazzola | B01L 3/502761 |
| 2018/0001235 | A1* | 1/2018 | Tange | B01D 29/117 |
| 2018/0016957 | A1* | 1/2018 | Woods | F01N 3/2892 |

FOREIGN PATENT DOCUMENTS

| | | |
|---|---|---|
| EP | 1947451 A2 | 7/2008 |
| EP | 2908120 A1 | 8/2015 |
| JP | 2005299441 A | 10/2005 |
| KR | 101205234 B1 * | 11/2012 |

OTHER PUBLICATIONS

European Search Report, dated May 3, 2016, 7 pages.
Chinese Search Report, Chinese Application No. 201610010015.1, Chinese Filing Date, Jan. 10, 2020.

* cited by examiner

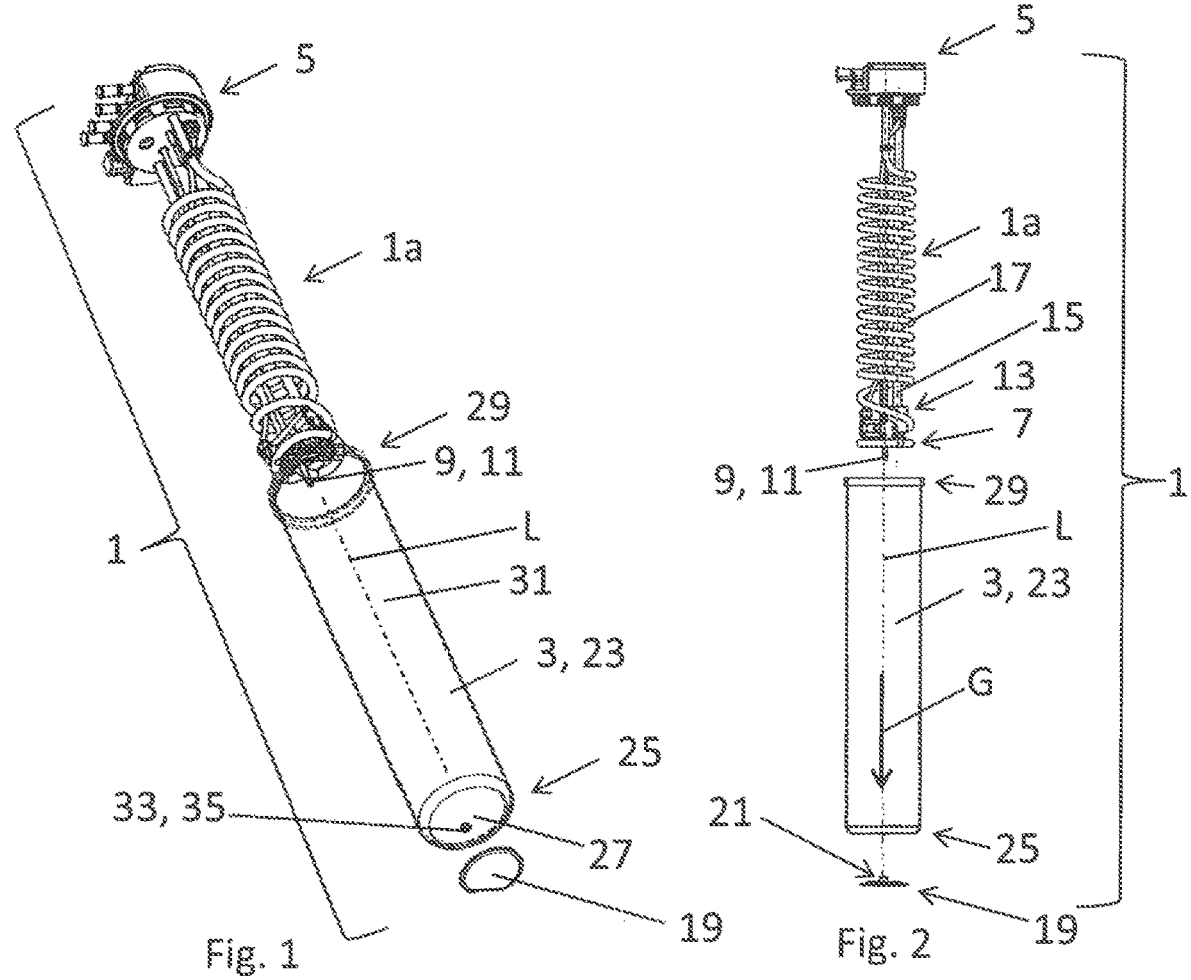
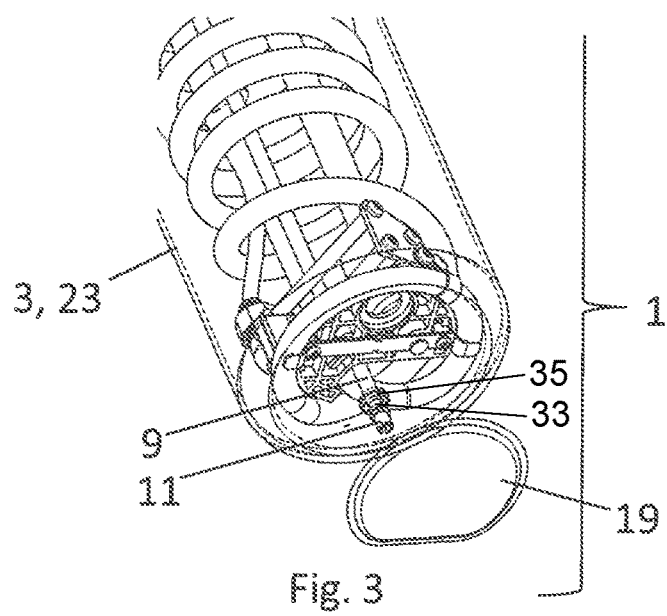

DEBUBBLING SLEEVE FOR FLUID SENSORS AND SENSOR SYSTEMS COMPRISING SAME

CROSS-REFERENCE TO RELATED APPLICATIONS

This application claims the benefit of the filing date under 35 U.S.C. § 119(a)-(d) of European Patent Application No. 15194826.2, filed on Nov. 16, 2015.

FIELD OF THE INVENTION

The invention relates to a fluid sensor system, and more particularly, to a debubbling sleeve for keeping gas bubbles off a fluid sensor of a fluid sensor system.

BACKGROUND

Fluid sensors and sensor systems are known in the prior art. Fluid sensors can be adapted for measuring fluid quantities such as fluid levels, compound concentrations, or purity. If a fluid system is exposed to movements such as vibrations, for example in a motorized device, then the fluid may tend to produce bubbles of a surrounding gas such as air. These bubbles may influence the sensor and lead to inaccurate measurements. Urea-based liquids such as diesel exhaust fluid ("DEF") are especially known for having a high propensity to accumulate gases and to form bubbles.

In US 2015/0089996 A1, a system for reducing the aeration of a fluid sensor system is described in which the sensor system is covered by a mesh filter which has the overall shape of a half pipe. The prior art system, however, has a complex shape and is therefore laborious and costly to produce.

SUMMARY

An object of the invention, among others, is to provide a debubbling sleeve for a fluid sensor which decreases the amount of bubbles in the fluid around the sensor, thereby increasing the accuracy of the sensor, while also avoiding affecting the intake of the fluid. The disclosed debubbling sleeve has a receptacle closed circumferentially around a sleeve bottom and a first passageway extending through the sleeve bottom. The receptacle contains the fluid sensor.

BRIEF DESCRIPTION OF THE DRAWINGS

The invention will now be described by way of example with reference to the accompanying figures, of which:

FIG. 1 is a perspective view of a sensor system having a debubbling sleeve according to the invention in an unmounted state;

FIG. 2 is a front view of the sensor system of FIG. 1 in the unmounted state;

FIG. 3 is an enlarged perspective view of the sensor system of FIG. 1 in a mounted state;

DETAILED DESCRIPTION OF THE EMBODIMENT(S)

Figure 4:
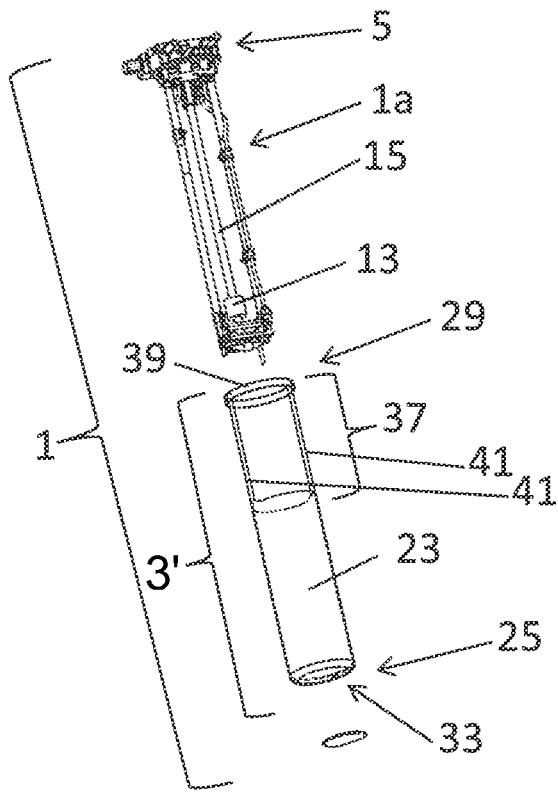
FIG. 4 is a perspective view of a sensor system having a debubbling sleeve according to the invention in an unmounted state.

The specific embodiments of the present invention will be described hereinafter in detail, and examples thereof are illustrated in the attached drawings, in which like reference numerals refer to like elements. The specific embodiments described with reference to the attached drawings are only exemplary, so as to fully convey the scope of the invention to those skilled in the art, and should not be construed as limiting the present invention.

A sensor system 1 according to the invention is shown in FIGS. 1-3. The sensor system 1 includes a sensor assembly 1a and a debubbling sleeve 3. The major components of the invention will now be described in greater detail.

The sensor assembly 1a, as shown in FIGS. 1 and 2, has a sensor flange 5 for connecting the sensor system 1 to a fluid tank. The sensor flange 5 may also form a header for the sensor system 1 providing inlet and outlet posts for a fluid and other conduits which may be necessary for the sensor system 1. The sensor assembly 1a extends along a longitudinal axis L from the sensor flange 5 towards a distal end 7. A suction tube 9 extends from the sensor flange 5 to the distal end 7 in parallel with the longitudinal axis L. An inlet port 11 of the suction tube 9 forms an end of the suction tube 9 and protrudes away from the distal end 7 along the longitudinal axis L.

The sensor assembly 1a also has at least one fluid sensor 13 disposed on a sensor rod 15 extending between the sensor flange 5 and the distal end 7. The at least one fluid sensor 13 is adapted for measuring qualities of a fluid, including the level of the fluid, the temperature, the concentration of a certain compound, and/or other quantities. The sensor assembly 1a also has a temperature control arrangement 17, which may heat or cool a fluid which surrounds the sensor 13. The temperature control arrangement 17 is shown as a spiral formed as either an electrical heating coil or a pipe which allows a coolant to be transmitted through the sensor system 1.

The sensor assembly 1a additionally has an inlet filter 19 which can be connected to the inlet port 11 of the suction tube 9. The inlet filter 19 has an adapter 21 with an opening that allows the inlet port 11 of the suction tube 9 to be inserted into the adapter 21 to mount the inlet filter 19 on the inlet port 11.

The debubbling sleeve 3, as shown in FIGS. 1-3, provides a receptacle 23 containing the sensor assembly 1a including the fluid sensor 13. The debubbling sleeve 3 has a sleeve bottom 25 with a planar face 27. The receptacle 23 is closed circumferentially around the sleeve bottom 25 and extends circumferentially along the longitudinal axis L. The receptacle 23 of the debubbling sleeve 3 has an overall cup shape; an upper sleeve end 29 opposite to a sleeve bottom 25 of the debubbling sleeve 3 is open to permit insertion of the sensor assembly 1a into the debubbling sleeve 3. The receptacle 23 may have other shapes, such as an oval, rectangular or polygonal cross-section. The upper sleeve end 29 may have a rim or other elements that detachably connect to the sensor flange 5 of the sensor assembly 1a.

The debubbling sleeve 3 is formed of a semipermeable material 31 chosen to permit fluid to move through the debubbling sleeve 3 while preventing bubbles of a certain size from moving through the debubbling sleeve 3. In the region of the sleeve bottom 25, in the face 27 of the sleeve bottom 25, the debubbling sleeve 3 has at least one first passageway 33 extending through the sleeve bottom 25. As shown in FIG. 1, the first passageway 33 has a passageway flange 35 surrounding the first passageway 33. The passageway flange 35 may help to stabilize the material 31 around the first passageway 33.

As shown in FIG. 3, the suction tube 9 protrudes through the first passageway 33 such that the inlet port 11 is arranged outside the debubbling sleeve 3. In a mounted state of the sensor assembly 1a and the debubbling sleeve 3, the inlet port 11 is arranged outside the debubbling sleeve 3, and the majority of the suction tube 9 is arranged inside the debubbling sleeve 3. The suction tube 9 may be surrounded by the passageway flange 35 at the first passageway 33. In an operating state, the inlet filter 19 may be mounted onto the suction tube 9 by insertion of the inlet port 11 into the adapter 21.

The sensor system 1 including the mounted debubbling sleeve 3, with the inlet filter 19 mounted on the inlet port 11, is inserted in a fluid tank. The sensor system 1 may be a urea sensor system used in a diesel exhaust fluid ("DEF") tank. The sensor flange 5 may be connected to the tank. In an operating position of the sensor system 1, as shown in FIG. 2, the longitudinal axis L of the sensor system 1 extends along a gravitational direction G so that bubbles which are present in the receptacle 23 rise against the gravitational direction G away from the bottom and leave the receptacle 23. When the sensor system 1 is inserted in the fluid tank and surrounded by a fluid, the debubbling sleeve 3 effectively prevents the formation of bubbles at the fluid sensor 13 inside the debubbling sleeve 3 by reducing the movement of fluid inside the debubbling sleeve 3 around the fluid sensor 13. At the same time, the intake of fluid into the inlet port 11 is not influenced by the debubbling sleeve 3 since the inlet port 11 is arranged outside the debubbling sleeve 3, and the fluid sensor 13 is submerged in a sufficient quantity of fluid to obtain accurate measurements.

Figure 5:
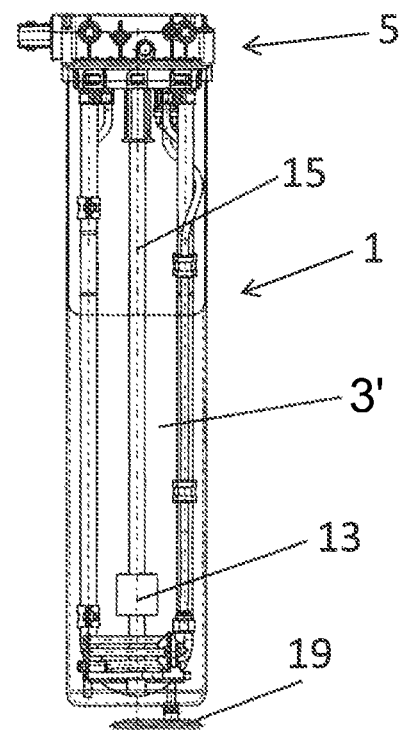
FIG. 5 is a front view of the sensor system of FIG. 4 in a mounted state.

A debubbling sleeve 3' according to another embodiment of the invention is shown in FIGS. 4 and 5. For the sake of brevity, only the differences with respect to the embodiment shown in FIGS. 1-3 are described in detail.

In contrast to the debubbling sleeve 3 shown in FIGS. 1-3, the receptacle 23 of the debubbling sleeve 3' circumferentially surrounds the bottom 25 and a connection section 37 extends from the upper sleeve end 29 to the receptacle 23. At the upper sleeve end 29, a ring-like mounting member 39 is disposed for mounting the debubbling sleeve 3' to the sensor flange 5 of the sensor assembly 1a. The mounting member 39 may be connected to the receptacle 23 by two supports 41 of the connection section 37. The supports 41 may either be made from the material 31 as part of the debubbling sleeve 3 forming the receptacle 23 or from any other suitable material. For example, the supports 41 may be made from a solid material. As shown in FIG. 5, the sensor 13 is arranged inside the receptacle 23 of the debubbling sleeve 3' in a mounted state.

Figure 6:
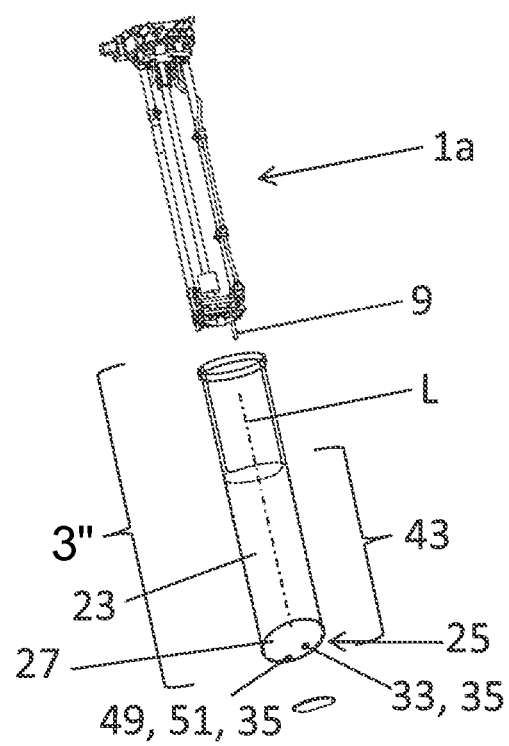
FIG. 6 is a perspective view of a sensor system having a debubbling sleeve according to the invention in an unmounted state.
Figure 7:
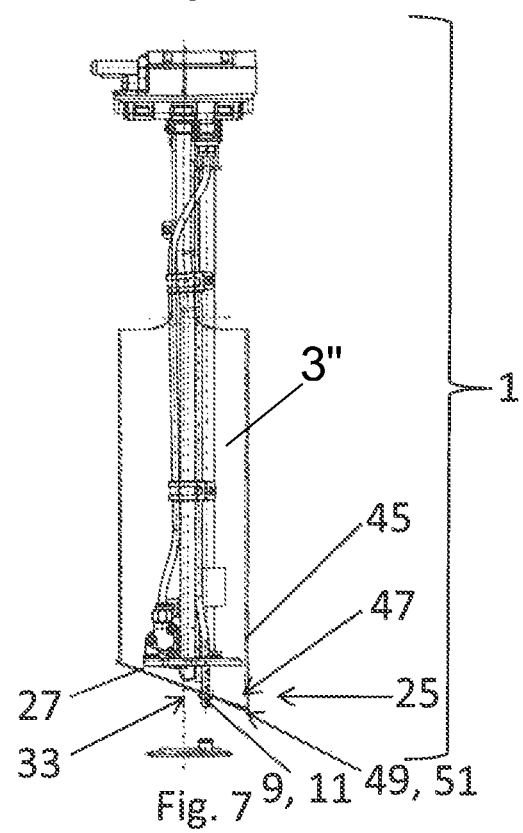
FIG. 7 is a front view of the sensor system of FIG. 6 in a mounted state.

A debubbling sleeve 3" according to another embodiment of the invention is shown in FIGS. 6 and 7. For the sake of brevity, only the differences with respect to the embodiments shown in FIGS. 1-5 are described in detail. The debubbling sleeve 3" has an overall shape similar to the debubbling sleeve 3' shown in FIGS. 4 and 5, except for the region around the bottom 25.

The debubbling sleeve 3" extends along the longitudinal axis L and is circumferentially closed along the longitudinal axis L to form the receptacle 23. This part of the receptacle 23, which extends circumferentially along the longitudinal axis L, forms a circumferential section 43. The sleeve bottom 25 and the face 27 of the sleeve bottom 25 of the circumferential section 43 are inclined with respect to the longitudinal axis L. The sleeve bottom 25 is inclined with respect to a wall 45 of the receptacle 23. Between the wall 45 and the sleeve bottom 25 or the face 27 of the sleeve bottom 25, an angled region 47 is formed, wherein the wall 45 and the face 27 abut each other with an acute angle. In the angled region 47 with the acute angle, sediments may be collected.

The bottom 25 of the debubbling sleeve 3" has the first passageway 33 and a second passageway 49. The first passageway 33 is comparable to the one as described above with respect to the debubbling sleeve 3 and allows a suction tube 9 of the sensor assembly 1a to protrude through the first passageway 33. The second passageway 49 extends through the sleeve bottom 25 in the angled region 47. The second passageway 49 may also be provided with a passageway flange 35. The second passageway 49 allows for sediments which are collected in the angled region 47 to exit the receptacle 23. Therefore, the second passageway 49 forms a sediment exhaust opening 51.

Figures 8, 9:
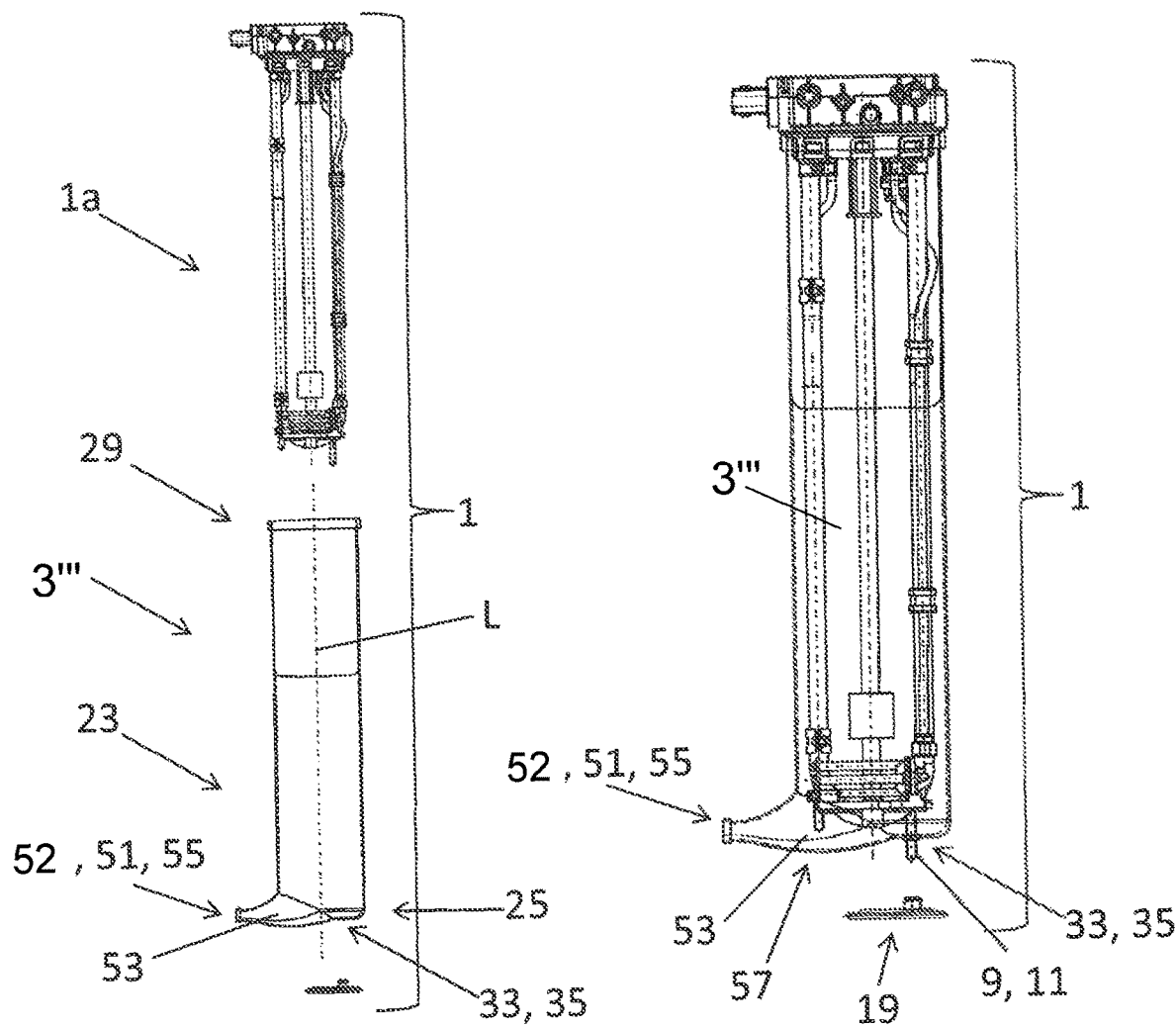
FIG. 8 is a front view of a sensor system having a debubbling sleeve according to the invention in an unmounted state.
FIG. 9 is a front view of the sensor system of FIG. 8 in a mounted state.

A debubbling sleeve 3''' according to another embodiment of the invention is shown in FIGS. 8 and 9. For the sake of brevity, only the differences with respect to the embodiments shown in FIGS. 1-7 are described in detail.

The debubbling sleeve 3''' has an extension 53 in the region of the sleeve bottom 25, which extends substantially perpendicular to the longitudinal axis L of the debubbling sleeve 3. Therefore, the extension 53 extends substantially parallel with the bottom 25 of the debubbling sleeve 3. At a distal end 55 of the extension 53, the extension 53 has an extension passageway 52. The extension passageway 52 forms a sediment exhaust opening 51. The extension 53 tapers towards the extension passageway 52. The extension 53 may be formed monolithically with the receptacle 23. The extension 53 aids in transporting sediments away from the inlet port 11 of the suction tube 9, and is therefore arranged on an opposite side of the debubbling sleeve 3 from the first passageway 33. For good stability of the sediment exhaust opening 51, the extension passageway 52 may have a passageway flange 35.

In order to allow sediments to be collected in the extension 53 prior to exhaustion, the extension 53 may have a bulbous mid-section 57 in which the extension 53 extends farther away from the upper sleeve end 29 than the extension passageway 52. If the longitudinal axis L is arranged substantially parallel with a gravitational direction G, then the mid-section 57 collects sediments which can be exhausted by the sediment exhaust opening 51.

Advantageously, in the sensor system 1 having a debubbling sleeve 3 according to the invention, when the fluid sensor 13 is placed inside the receptacle 23, the receptacle 23 surrounds the fluid sensor 13 and prevents or at least decreases the creation of bubbles around the sensor 13. The debubbling sleeve 3 further prevents the transport of bubbles into the receptacle 23. The at least one passageway 33 permits protrusion of the suction tube 9, and consequently, the debubbling sleeve 3 prevents the formation of bubbles without negatively impacting fluid intake. Additionally, the sediment exhaust opening 51 allows sediments to leave the receptacle 23 to further increase the accuracy of the fluid sensor 13.

What is claimed is:

1. A debubbling sleeve, comprising:
    a receptacle closed circumferentially and having a sleeve bottom extending perpendicular with respect to a longitudinal axis of the receptacle, the receptacle containing a fluid sensor of a sensor system; and
    an extension extending from the sleeve bottom substantially perpendicular to the longitudinal axis of the receptacle, the extension has an extension passageway extending through the extension, the extension passageway is open in a direction perpendicular to the longitudinal axis and is in communication with the receptacle, the sleeve bottom and the extension enclose the receptacle along the longitudinal axis except for a first passageway extending through a portion of the sleeve bottom.

2. The debubbling sleeve of claim 1, wherein the debubbling sleeve is formed of a semi-permeable material.

3. The debubbling sleeve of claim 1, wherein the first passageway extends through a planar face of the sleeve bottom.

4. The debubbling sleeve of claim 1, wherein a passageway flange surrounds the first passageway.

5. The debubbling sleeve of claim 1, wherein the sensor system is a urea sensor system.

6. The debubbling sleeve of claim 1, wherein the extension has a bulbous mid-section positioned further from an upper sleeve end of the receptacle than a sediment exhaust opening of the extension passageway is positioned from the upper sleeve end of the receptacle, the upper sleeve end of the receptacle is opposite the sleeve bottom.

7. A sensor system, comprising:
    a sensor assembly having a fluid sensor and a suction tube with an inlet port; and
    a debubbling sleeve having a receptacle closed circumferentially and including a sleeve bottom extending perpendicular with respect to a longitudinal axis of the receptacle and an extension extending from the sleeve bottom substantially perpendicular to the longitudinal axis of the receptacle, the sleeve bottom and the extension enclose the receptacle along the longitudinal axis except for a first passageway extending through a portion of the sleeve bottom, the fluid sensor disposed inside the debubbling sleeve and the suction tube protruding through the first passageway to an area outside the debubbling sleeve such that the inlet port is disposed outside the debubbling sleeve, the extension has an extension passageway extending through the extension, and the extension passageway is open in a direction perpendicular to the longitudinal axis and is in communication with the receptacle.

8. The sensor system of claim 7, wherein, in an operating position of the sensor system, the longitudinal axis of the sensor system extends along a gravitational direction.

9. The sensor system of claim 7, wherein the suction tube has an inlet filter, the inlet filter disposed outside the debubbling sleeve.

10. The sensor system of claim 7, wherein the sensor assembly has a sensor flange connecting the sensor system to a fluid tank.

11. The sensor system of claim 10, wherein the debubbling sleeve is connected to the sensor flange.

12. The sensor system of claim 11, wherein the debubbling sleeve encloses a sensor rod extending from the sensor flange.

13. The sensor system of claim 12, wherein the fluid sensor is disposed on the sensor rod.

14. A sensor system, comprising:
    a sensor assembly having a fluid sensor and a suction tube with an inlet port; and
    a debubbling sleeve having a receptacle closed circumferentially and including a sleeve bottom, a first passageway extending through the sleeve bottom, and an extension extending from the sleeve bottom substantially perpendicular to a longitudinal axis of the receptacle, a distal end of the extension having an extension passageway forming a sediment exhaust opening, the extension passageway is open in a direction perpendicular to the longitudinal axis and is in communication with the receptacle.

15. The sensor system of claim 14, wherein the fluid sensor is disposed inside the debubbling sleeve.

16. The sensor system of claim 15, wherein the suction tube protrudes through the first passageway to an area outside the debubbling sleeve such that the inlet port is disposed outside the debubbling sleeve.

17. The sensor system of claim 14, wherein the extension is formed monolithically with the receptacle.

\* \* \* \* \*

UNITED STATES PATENT AND TRADEMARK OFFICE
CERTIFICATE OF CORRECTION

PATENT NO. : 10,794,734 B2
APPLICATION NO. : 15/351539
DATED : October 6, 2020
INVENTOR(S) : Frank Thomsen Page 1 of 1

It is certified that error appears in the above-identified patent and that said Letters Patent is hereby corrected as shown below:

On the Title Page

Item (73), Assignee, Line 1, delete "NORAG" and insert --NORGE-- therefor

Page 2, Column 2, Other Publications, Line 2, delete "201610010015.1," and insert --201611010015.1,-- therefor Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*